Patented Oct. 23, 1934

1,978,040

UNITED STATES PATENT OFFICE 1,978,040

PROCESS FOR MAINTAINING THE SPRINKLING CAPABILITY OF FINELY GRANULAR TABLE SALT

Werner Daitz, Lubeck, Germany, assignor to firm Daitz Patents Foundation Binningen (Basel)-New-York, Binningen, near Basel, Switzerland No Drawing. Application April 25, 1933, Serial No. 667,933. In Germany September 14, 1931

4 Claims. (Cl. 23—243)

It is well known that fine table salt cakes together more or less during storage to form small or large lumps and as a result loses its satisfactory sprinkling capability. The generally accepted reason for this is the foreign salts present in the table salt, more particularly soluble calcium and magnesium salts. It has not been possible, however, to make a fine table salt of permanent satisfactory sprinkling capability by diminishing the quantity of foreign salts in the same. For this reason in order to avoid caking together pulverulent substances of various kinds have been added to the fine table salt, more particularly substances which are insoluble in water, such as rice flour, artificial magnesium silicate, finely crystalline silicic acid, natural or artificial amorphous silicic acid or the like. When these additions are made, however, the table salt yields turbid solutions when mixed with water and for this reason such additions are to be regarded as of very little value.

According to the present invention an addition is made to the table salt, that is to say, both crystalline high-percentage cooking or common salt as well as ground rock salt, which does not impair the solubility of the salt. This addition consists of finely granular potassium chloride which may be added to the table salt in varying quantities, according as to what has been found preferable from preliminary experiments, either during the production of the table salt or else to the finished finely granular salt. In many cases a mixture ratio of 2-3 parts of potassium chloride to 100 parts of finely granular table salt is sufficient to maintain the satisfactory sprinkling properties of the salt for a long time. If the quantity of potassium chloride added is diminished then its effect in maintaining the sprinkling capability of the table salt is very rapidly decreased. Generally speaking the potassium chloride content is adjusted to 5-7 parts in 100 parts of finely granular table salt. If the potassium chloride content is raised above this proportion then an increased effect is not obtained whilst on the other hand the taste of the salt is unfavorably affected.

The prominence of the taste of the potassium chloride in the mixture could be diminished by adding besides potassium chloride in addition very small quantities of sodium iodide or potassium iodide, to the extent of about 7 milligrammes per 1000 grammes of table salt mixture.

When using common or cooking salt for making the table salt the mixing with potassium chloride may be carried out by enriching the sodium chloride mother liquor with respect to potassium chloride so that at a suitable concentration and a corresponding temperature, bearing in mind the solubility ratios of sodium chloride and potassium chloride, the table salt is separated out in finely granular form with the desired potassium chloride content. This process yields the best finely granular table salt of good permanent sprinkling capability. Alternatively the procedure may be such that the necessary quantity of comminuted potassium chloride is added to the finely granular still moist salt, obtained in the usual way after separating the main portion of the mother liquor in the production of cooking salt, e. g. when centrifuging the salt in known centrifuges or when working up with other devices such as drying drums, shaking troughs, sieve devices or the like.

In the manufacture of finely granular table salt from rock salt operations are preferably carried out such that the potassium chloride is added to the rock salt during the grinding or sieving process. The action of the addition may be enhanced by adding the potassium chloride to the finely ground rock salt in the form of a concentrated solution before the drying operation.

Further experiments have shown that the action of the potassium chloride addition to the finely granular table salt can be still further raised, or alternatively the potassium chloride addition can be diminished without impairing the effect, by adding salts of phosphoric acid which are partially or wholly freed from water of crystallization at the same time. More particularly anhydrous disodium phosphate comes into question in this connection. No perceptible cloudiness occurs on dissolving table salt to which additions of such salts of phosphoric acid have been made. Addition of 0.3 to 1.5 parts of the phosphate to 100 parts of the table salt are usually sufficient. Such a mixture of sodium chloride with a moderate content of potassium chloride and anhydrous disodium phosphate, not only offers the advantage that the satisfatcory sprinkling capabilities of the finely granular table salt are better maintained, but the salt, in comparison to the table salts of the usual composition, also has the advantage that it contributes more to an improvement in the composition of the blood than the usual table salts. The improved biological suitability of the table salt is secured to an increased extent if in addition small quantities of anhydrous di-magnesium phosphate $MgHPO_4$ and dry di-calcium phosphate $CaHPO_4$ are added, the proportion being about 0.1 to 0.2 parts per 100 parts of finely granular table salt.

*Examples*

1. 100 kg. of sodium chloride are withdrawn from the vacuum evaporator with a moisture content of about 30%, introduced into the drying centrifuge, and mixed with 6 kg. of potassium chloride which is subdivided as finely as possible and has the same moisture content. The mixture is then centrifuged in the usual way, dried, ground and sieved. In this way an intimate mixture of the potassium chloride with the sodium chloride takes place during the whole manufacturing process, i. e. from the centrifuge up to the packing.

2. About 10 litres of a saturated solution prepared at 100° C. of about 560 parts of potassium chloride in 1000 parts of water are added to each 100 kg. of preliminarily ground rock salt in a heatable stirring apparatus and the salt is further worked up in the usual manner after drying. In this way, as in the working up of the cooking salt according to Example 1, an intimate and uniform admixture of the potassum chloride and sodium chloride is obtained, the ratio between these salts being about 6 parts of potassium chloride to 94 parts of sodium chloride.

3. A table salt is made from cooking salt in the manner described in Example 1, which contains 2-3 parts of potassium chloride per 100 parts. After manufacture this salt is admixed with anhydrous disodium phosphate in the ratio of 200 parts of the salt to one part of the phosphate.

It is well known that considerable quantities of other salts, even some potassium chloride, may be contained in impure sodium chloride. Here, however, it is a question of combining a sodium chloride which in itself is truly finely granular, such as is obtained as cooking salt or from rock salt, with those quantities of the said additions which better maintain the satisfactory sprinkling capability of the finely granular table salt. For this purpose the said additions have never been used, that is to say, neither potassium chloride nor the combination of potassium chloride with the said anhydrous phosphates.

I claim:

1. A process for maintaining satisfactory sprinkling efficiency of fine granular table salt, which consists in adding between 2% and 10% of potassium chloride to fine granular table salt made from cooking or rock salt.

2. A process in accordance with claim 1 in which an addition is made to the fine granular table salt together with the potassium chloride, of an anhydrous phosphate of an element selected from the group consisting of alkali, calcium and magnesium, and more particularly di-sodium phosphate.

3. Table salt maintaining satisfactory sprinkling efficiency, consisting of fine granular cooking or rock salt with an addition of between 2% and 10% of potassium chloride.

4. Table salt maintaining satisfactory sprinkling efficiency, consisting of fine granular cooking or rock salt with an addition of between 2% and 10% of potassium chloride, with an addition of a small quantity of anhydrous phosphate of an element selected from a group consisting of alkali, calcium, and more particularly di-sodium phosphate.

WERNER DAITZ.